(12) United States Patent
Tump

(10) Patent No.: US 7,534,970 B2
(45) Date of Patent: May 19, 2009

(54) COUNTERBALANCED DISPENSING SYSTEM

(75) Inventor: Ronald S. Tump, Whitewater, WI (US)

(73) Assignee: Schenck AccuRate, Inc., Whitewater, WI (US)

( * ) Notice: Subject to any disclaimer, the term of this patent is extended or adjusted under 35 U.S.C. 154(b) by 0 days.

(21) Appl. No.: 11/453,401

(22) Filed: Jun. 15, 2006

(65) Prior Publication Data
US 2007/0289783 A1    Dec. 20, 2007

(51) Int. Cl.
*G01G 11/00*    (2006.01)
*G01G 13/00*    (2006.01)

(52) U.S. Cl. .................. 177/116; 177/119; 177/185; 222/77; 73/861

(58) Field of Classification Search ......... 177/116–121, 177/185; 222/55, 56, 77; 141/83; 73/861
See application file for complete search history.

(56) References Cited

U.S. PATENT DOCUMENTS

| | | | | |
|---|---|---|---|---|
| 1,114,307 | A * | 10/1914 | Stimpson | 177/184 |
| 1,140,825 | A * | 5/1915 | Hopkinson | 177/173 |
| 3,565,196 | A * | 2/1971 | Laimins et al. | 177/211 |
| 3,568,886 | A | 3/1971 | Christmann | |
| 3,776,599 | A | 12/1973 | Reuter | |
| 3,780,818 | A * | 12/1973 | Lumby et al. | 177/256 |
| 3,786,961 | A * | 1/1974 | Wahl et al. | 222/55 |
| 3,837,416 | A * | 9/1974 | Nozaki | 177/196 |
| 4,015,480 | A | 4/1977 | Giers | |
| 4,015,677 | A * | 4/1977 | Silva et al. | 177/165 |
| 4,092,721 | A | 5/1978 | Rueff et al. | |
| 4,111,336 | A | 9/1978 | Ward et al. | |
| 4,202,466 | A | 5/1980 | Cook | |
| 4,209,990 | A * | 7/1980 | Shelton, Jr. | 60/640 |
| 4,211,340 | A | 7/1980 | Szakasits et al. | |
| 4,300,197 | A | 11/1981 | Schonfeld et al. | |
| 4,418,771 | A | 12/1983 | Henry et al. | |

(Continued)

FOREIGN PATENT DOCUMENTS

DE    25 19 795 A1    11/1976

(Continued)

OTHER PUBLICATIONS

"Engineering Mechanics: Statics and Dynamics", Higdon et al, Prentice-Hall, Inc. Englewood Cliffs, New Jersey, (c) 1976, pp. 22-35.*

(Continued)

*Primary Examiner*—Randy W Gibson
(74) *Attorney, Agent, or Firm*—Foley & Lardner LLP

(57) ABSTRACT

A system and method of measuring and dispensing material in a container is disclosed. The system may comprise a container, a feeder, a frame, a first sensor, and a second sensor. The container is configured to contain the material. The feeder receives and conveys material from the container. The frame is pivotal about a pivot and supports at least the container. The first sensor produces a signal representative of at least a weight of a portion of the material in the container. The second sensor produces a signal representative of the weight being applied to the pivot or fulcrum, which may be a portion of the weight within the container. A device sums the weights detected by the first sensor and the second sensor.

35 Claims, 6 Drawing Sheets

U.S. PATENT DOCUMENTS

| | | | | |
|---|---|---|---|---|
| 4,449,597 | A | 5/1984 | Ricciardi et al. | |
| 4,464,934 | A | 8/1984 | Giers | |
| 4,483,404 | A * | 11/1984 | Weihs | 177/255 |
| 4,484,474 | A | 11/1984 | Maus | |
| 4,489,797 | A * | 12/1984 | Gordon | 177/128 |
| 4,494,678 | A * | 1/1985 | Klein | 222/77 |
| 4,579,252 | A | 4/1986 | Wilson et al. | |
| 4,722,456 | A | 2/1988 | Laidlaw et al. | |
| 4,726,690 | A | 2/1988 | Thelen | |
| 4,730,499 | A * | 3/1988 | Gianella et al. | 73/861 |
| 4,744,254 | A * | 5/1988 | Barten | 73/862.622 |
| 4,775,949 | A | 10/1988 | Kalata | |
| 4,804,053 | A * | 2/1989 | Nordstrom | 177/211 |
| 4,805,462 | A | 2/1989 | Labschies | |
| 4,926,341 | A | 5/1990 | Guyot | |
| 4,945,957 | A | 8/1990 | Kardux et al. | |
| 4,948,322 | A | 8/1990 | Kunstmann | |
| 4,972,970 | A | 11/1990 | Toerner | |
| 4,977,526 | A | 12/1990 | Jost et al. | |
| 4,990,052 | A | 2/1991 | Kunstmann | |
| 5,005,657 | A * | 4/1991 | Ellion et al. | 177/246 |
| 5,007,561 | A * | 4/1991 | Wahl et al. | 222/55 |
| 5,007,564 | A | 4/1991 | Beth et al. | |
| 5,014,426 | A | 5/1991 | Maus | |
| 5,058,428 | A | 10/1991 | Guyot | |
| 5,081,600 | A | 1/1992 | Tump | |
| 5,103,401 | A | 4/1992 | Johnson | |
| 5,119,893 | A | 6/1992 | Jost | |
| 5,156,224 | A | 10/1992 | Leifeld | |
| 5,160,016 | A | 11/1992 | Moksnes | |
| 5,172,783 | A * | 12/1992 | Feinland et al. | 177/185 |
| 5,237,869 | A | 8/1993 | Heiland | |
| 5,240,324 | A | 8/1993 | Phillips et al. | |
| 5,260,880 | A | 11/1993 | Tump | |
| 5,265,763 | A | 11/1993 | Heinrici et al. | |
| 5,316,195 | A | 5/1994 | Moksnes et al. | |
| 5,455,395 | A * | 10/1995 | Hafner | 177/145 |
| 5,466,894 | A * | 11/1995 | Naef | 177/59 |
| 5,567,919 | A * | 10/1996 | Cote | 177/50 |
| 5,600,551 | A | 2/1997 | Luscher, Jr. | |
| 5,670,751 | A * | 9/1997 | Hafner | 177/1 |
| 6,058,794 | A | 5/2000 | Hempel | |
| 6,109,478 | A * | 8/2000 | Blenkinsop et al. | 222/77 |
| 6,168,305 | B1 | 1/2001 | Marmsater | |
| 6,186,360 | B1 | 2/2001 | Becker et al. | |
| 6,284,987 | B1 * | 9/2001 | Al-Modiny | 177/170 |
| 6,437,255 | B1 * | 8/2002 | Ludescher | 177/16 |
| 6,444,926 | B1 | 9/2002 | Ricciardi, Sr. | |
| 6,446,836 | B1 | 9/2002 | Aalto et al. | |
| 6,520,012 | B1 | 2/2003 | Schonfeld | |
| 6,539,852 | B2 | 4/2003 | Ertl | |
| 6,568,567 | B2 | 5/2003 | McKenzie et al. | |
| 6,644,344 | B2 * | 11/2003 | Tibbott | 137/403 |
| 6,688,496 | B1 | 2/2004 | Ahlmer et al. | |
| 6,705,171 | B1 | 3/2004 | Toerner | |
| 6,774,319 | B2 * | 8/2004 | Aoki et al. | 177/144 |
| 6,802,434 | B2 | 10/2004 | Johnson et al. | |
| 6,911,607 | B2 | 6/2005 | Klijn | |
| 6,928,853 | B2 | 8/2005 | Koenig | |
| 6,931,947 | B2 * | 8/2005 | Schulze et al. | 73/862.381 |
| 6,952,971 | B2 | 10/2005 | Brotzmann et al. | |
| 7,017,624 | B2 | 3/2006 | Reinsch et al. | |
| 7,019,224 | B2 | 3/2006 | Kawanishi et al. | |
| 7,129,424 | B2 * | 10/2006 | Vilhjalmsson et al. | 177/25.13 |
| 7,214,893 | B2 * | 5/2007 | Sikula | 177/238 |
| 2005/0166673 | A1 * | 8/2005 | Kimbara et al. | 73/296 |
| 2005/0267628 | A1 | 12/2005 | Crowder et al. | |
| 2006/0043104 | A1 | 3/2006 | Ricciardi, Sr. et al. | |
| 2006/0151217 | A1 * | 7/2006 | Mill et al. | |

FOREIGN PATENT DOCUMENTS

| | | |
|---|---|---|
| DE | 37 42 229 A1 | 6/1989 |
| DE | 4226188 A1 | 2/1994 |
| GB | 1508445 A | 4/1978 |
| WO | WO 98/31993 A | 7/1998 |

OTHER PUBLICATIONS

Schenck Accurate Product Description for SolidsFlow Model 2000 Feeder, Copyright 2005, 4 pages.

Accurate Bulk Solids Metering Brochure for Bulk Solids Metering Products, Copyright 2005, 11 pages.

Schenck Accurate Brochure, "A Trusted Source for Products & Integrated Systems", Copyright 2005, 4 pages.

Schenck Accurate Pharmaceutical Application Brochure for TUF-FLEX™ Feeders, Copyright 2004, 2 pages.

AccuRate Bulk Solids Metering Brochure "Excellence in Bulk Solids Metering for Pharmaceuticals & Nutraceuticals", Copyright 2004, 4 pages.

International Search Report for PCT/IB2007/003739, Jun. 12, 2008.

AccuRate Bulk Solids Metering Brochure, "Feeding and Metering Bulk Dry Material for Pharmaceutical Applications," believed to have been publicly available before Jun. 15, 2006, 1 page.

AccuRate Bulk Solids Metering, Dry Materials Feeding Handbook, believed to have been publicly available before Jun. 15, 2006, 19 pages.

Schenck Accurate Product Description for Multiicor Mass Flow Meter, believed to have been publicly available before Jun. 15, 2006, 4 pages.

Written Opinion for Application No. PCT/IB2007/003739, mailing date Mar. 26, 2008, 5 pages.

* cited by examiner

COUNTERBALANCED DISPENSING SYSTEM

FIELD OF THE INVENTION

The present invention relates to a weight sensing system used for dispensing material. More specifically, the present invention relates to a counterbalance system that utilizes multiple load cells to measure material that is being precisely dispensed from a hopper at low feed rates.

BACKGROUND

It is generally known to dispense material at low feed rates. Many low feed rate applications typically require accurate and precise dispensing of material; for example, pharmaceuticals, cosmetics, dietary and nutrition products, chemical compositions, or the like. Such applications typically use batch feeder systems for their accuracy and precision. However, such batch systems are slow compared to other types of dispensing systems such as continuous dispensing systems.

It is also generally known to continuously dispense material by controlling the feed rate by monitoring or measuring weight of material in a hopper, which are generally referred to as gravimetric or loss-in-weight dispensing system. Such known gravimetric dispensing systems typically include a hopper supported on a scale, one or more weight sensors to measure the weight of the hopper, and a feeder to move material from the hopper to a discharge chute. The weight of the empty hopper may be counterbalanced by a dead weight so that the weight sensor only detects the weight of material within the hopper. However, such known gravimetric dispensing systems have several disadvantages. For example, typical gravimetric systems are designed to dispense large amounts of material and not to precisely dispense small amounts of material. Also, the location of the weight sensor in known dispensing systems results in inaccurate measurements of the total weight of material in the hopper when shifted material does not cause a force to be applied to the weight sensor. Known systems may try to compensate for shifting loads by using an accelerometer or an electronic filters of one kind or another; however, the use of such electronics tends to decrease the accuracy and speed of measurement. For example, U.S. Pat. No. 4,722,456 describes a loss-in-weight feeding system including a weight sensing system having a balance assembly, a weight sensor, and an accelerometer. The accelerometer is mounted on a beam close to the position of the weight sensor and is specifically described as being sufficiently remote from the main fulcrum.

Accordingly, it would be advantageous to provide a dispensing system that could continuously and precisely dispense material at low feed rates. It would also be advantageous to provide a dispensing system that has multiple weight sensors that more accurately measure the weight of material within the hopper under a variety of material configuration conditions. It would further be advantageous to provide a dispensing system that uses two or more load cells, particularly one large capacity load cell located at the pivot point of a counterbalanced scale and one low capacity load cell located at the hopper. It would further be advantageous to provide a counterbalanced weight sensing system applicable in a variety of applications including dry material feeders, bulk solid metering, loading or unloading trucks, trailers, railcars, and the like. It would be desirable to provide for a counterbalanced dispensing system with multiple load cells having one or more of these or other advantageous features. To provide an inexpensive, reliable, and widely adaptable counterbalanced dispensing system with multiple load cells that avoids the above-referenced and other problems would represent a significant advance in the art.

SUMMARY

The present invention relates to a system for dispensing material comprising a hopper, a dispenser, a frame, a first sensor, and a second sensor. The hopper comprises a weight and is configured to contain the material. The dispenser is configured to receive material from the hopper and to dispense material. The frame is pivotal about a pivot and is configured to support at least the hopper. The first sensor is configured to provide a signal representative of at least a weight of a first portion of the material in the hopper. The second sensor is coupled to the pivot and configured to provide a signal representative of a weight of a second portion of the material in the hopper. The total weight of material in the hopper is the sum of the weight detected by the first sensor and the weight detected by the second sensor.

The present invention also relates to a weight sensor system for detecting a total weight of material in a container that is counterbalanced about a pivot. The weight measurement system comprises a first sensor configured to provide a signal representative of at least a portion of the weight of material in the container; and a second sensor coupled to the pivot and configured to provide a signal representative of the weight of material that is not detected by the first sensor. The total weight of material in the container is calculated based on the sum of the weight detected by the first sensor and the weight detected by the second sensor. Such an apparatus may be utilized in dry material feeders, bulk solid metering, or for loading or unloading trucks, trailers, railcars, and the like.

The present invention further relates to a method for calculating the total weight of material within a hopper in a dispensing system. The method comprises providing a frame pivotal about a pivot, a first sensor coupled to the hopper, and a second sensor coupled to the pivot; counterbalancing at least the weight of the hopper; detecting a first portion of the weight of the material in the hopper based on a signal from first sensor; detecting a second portion of the weight of material in the hopper based on a signal received from the second sensor; and calculating the total weight of material in the hopper by summing the first portion of the weight detected by the first sensor and the second portion of the weight detected by the second sensor.

The present invention further relates to an apparatus for detecting weight of material in a container. The apparatus comprises a frame counterbalanced on a pivot by a counterbalance force and configured to support the container; a first sensor configured to provide a signal representative of at least a portion of the weight of material in the container; and a second sensor coupled to the pivot and configured to provide a signal representative of the weight supported by the frame. The total weight of material in the container is calculated based on the sum of the weight detected by the first sensor and the weight detected by the second sensor. Such an apparatus may be utilized in dry material feeders, bulk solid metering, or for loading or unloading trucks, trailers, railcars, and the like.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF THE PREFERRED AND EXEMPLARY EMBODIMENTS

Figure 1:
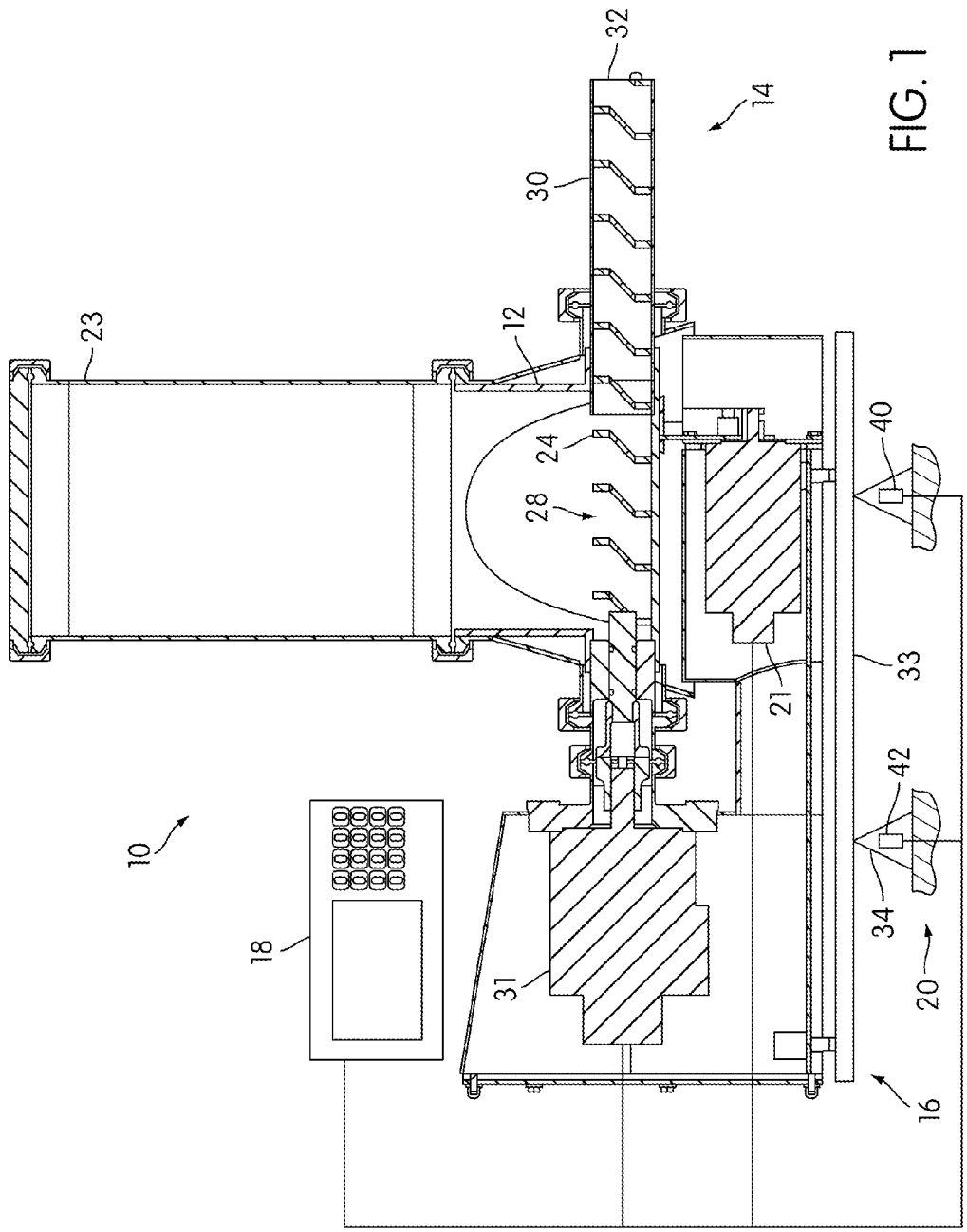
FIG. 1 is a side sectional view of a counterbalanced dispensing system according to an exemplary embodiment.

FIG. 1 schematically illustrates a dispensing system shown generally as a loss-in-weight dispensing system 10. System 10 comprises a receptacle or container shown as a hopper 12, a material dispenser shown as a feeder 14, a frame shown as a counterbalanced scale 16, a weight sensing system 20, and a controller 18. System 10 is configured to dispense a product or material 22 at a predetermined rate and at a relatively uniform discharge. According to an exemplary embodiment, the material 22 is a separable material (such as particulate, granules, powder, pellets, particles, bits, pieces, or the like). According to a particular embodiment, the particulate is an ingredient to be mixed with other materials and/or used to manufacture pharmaceuticals, cosmetics, food, and the like. According to exemplary embodiments, system 10 is configured to dispense or feed material 22 at a relatively low rate. For example, system 10 may be configured to dispense 20 grams of material per hour. According to alternative embodiments, system 10 may be configured to dispense at any of a variety of material feed rates. According to an exemplary embodiment, system 10 is configured to dispense material in a continuous mode, i.e., process characterized by an uninterrupted flow of the material of production through time. According to an alternative embodiment, system 10 is configured to operate in a non-continuous or batch mode, i.e., process characterized by a discharge of a certain preset quantity of material.

Hopper 12 contains material 22 that is distributed from feeder 14. Hopper 12 may be in communication with a source of material 22 such as a prefeeder, another bin, or the like, that periodically refills or reloads material 22 to hopper 12. To facilitate a continuous and uniform flow of material 22 from hopper 12 into feeder 14, an agitation mechanism or agitator may be provided to aid the flow of material and to condition the material to a constant density. For example, in systems employing flexible hoppers (e.g., vinyl, etc.), massaging paddles are driven by a motor 21 and are disposed to undulate against the sides of the hopper, vibrating the material within it. These vibrations are intended to condition the material into a uniform bulk density above the metering screw, and tend to prevent arching or bridging of the material across the hopper discharge and inhibits or prevents further flow. Examples of suitable commercially available feeders are AccuRate dry material feeders marketed by the assignee of the present application. In alternative embodiments, the hopper is a rigid structure that may have an internal agitator.

Hopper 12 tapers downwardly and inwardly to form a laterally extending duct or trough 28 at the bottom of hopper 12. The duct 28 is generally cylindrical and top opening and in communication with feeder 14. Feeder 14 receives material 22 flowing from hopper 12. Feeder 14 comprises a driven conveyer (shown as a metering auger or screw 24) mounted at least partially within a hollow member (e.g., tube, extension piece, hollow cylinder, etc. and generally referred to herein as a nozzle 30). Metering screw 24 urges (e.g., feeds, transports, flows, etc.) material 22 received from hopper 12 through nozzle 30 to a discharge port or chute 32, and then is discharged to packaging or process equipment in which the material is being used or to be further processed, mixed, or the like. According to an exemplary embodiment, the metering screw and agitation device are driven by one or more electric motors 31. According to alternative embodiments, the hopper, feeder, and metering screw may have any of a variety of configurations, shapes, sizes, or the like.

Scale 16 is preferably a mechanically counterbalanced scale, and comprises a frame 33 supported on a fulcrum or pivot 34. Frame 33 may comprise one or more members such as beams, arms, linkage, or the like. Frame 33 supports at least the hopper 12, and may support other components of system 10. According to a preferred embodiment, pivot 34 is a knife edge pivot 34. According to alternative embodiments, the pivot may be any of a variety of frictionless or friction pivot devices that allow pivoting or counterbalancing of hopper 12. Scale 16 may also include a dashpot to dampen vibrations or other components.

Controller 18 is a device configured to receive signals from weight sensing system 20, store data, analyze performance, and generate appropriate control signals to ensure that the weight of material discharged by feeder 14 is maintained in accordance with operator-input parameters or program specifying the desired feed rate/quantity. The controller compares signals representative of the actual feed rate to the set point feed rate and adjusts the speed of the motor 31. According to an exemplary embodiment, controller 18 comprises a computing device, a display, a user interface, and/or one or more signal converters. The computing device may comprise a computer, a processor, or the like. The user interface may be a keyboard, keypad, or the like. The signal converters may be analog to digital converters, digital to analog converters, or the like. Controller 18 is shown schematically coupled (in communication with) motor 31, motor 21, load cell 40, and load cell 42 in FIG. 1.

Figure 2:
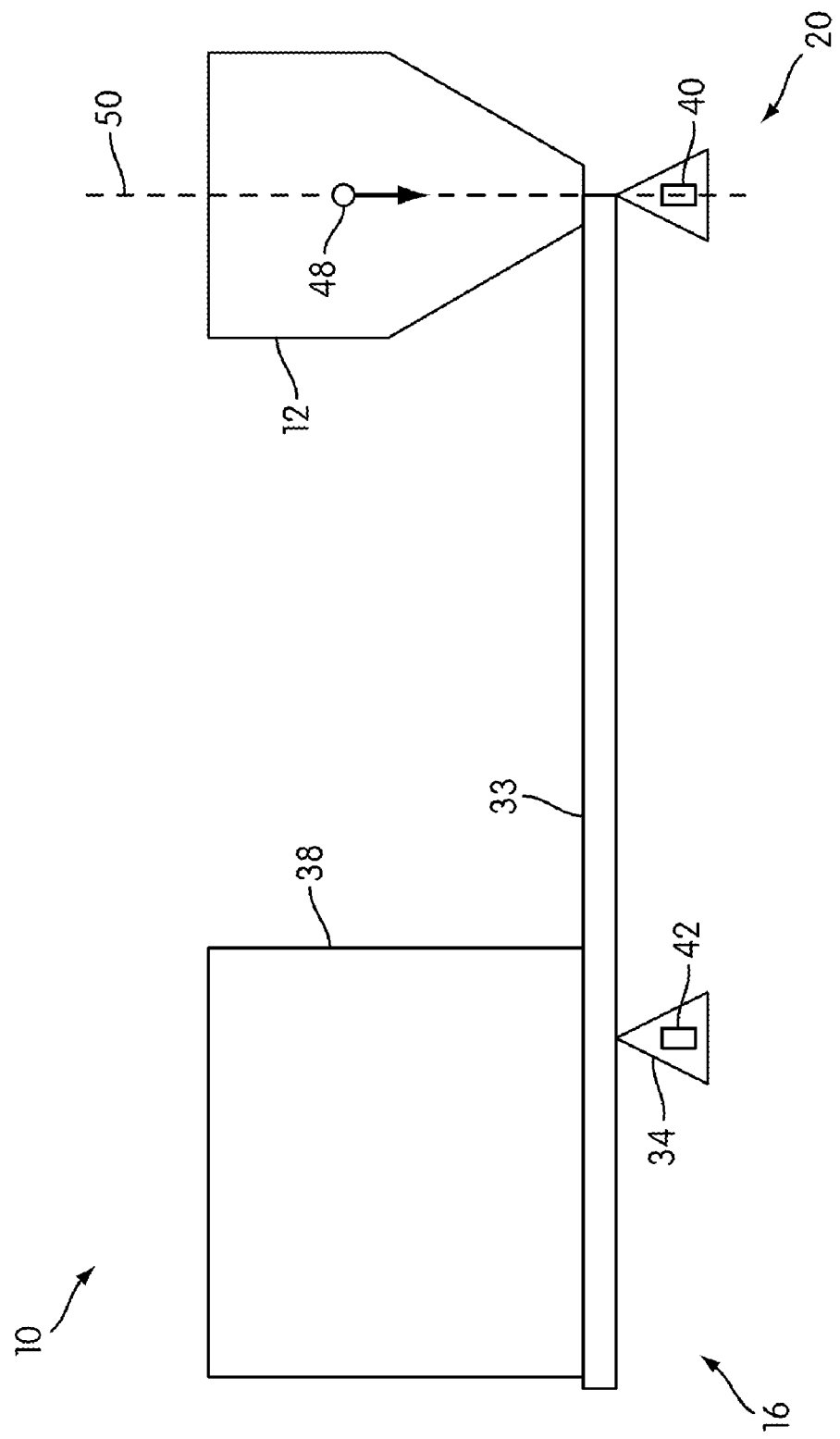
FIG. 2 is a schematic diagram of a counterbalanced dispensing system with an empty hopper and multiple weight sensors according to a preferred embodiment.
Figure 3:
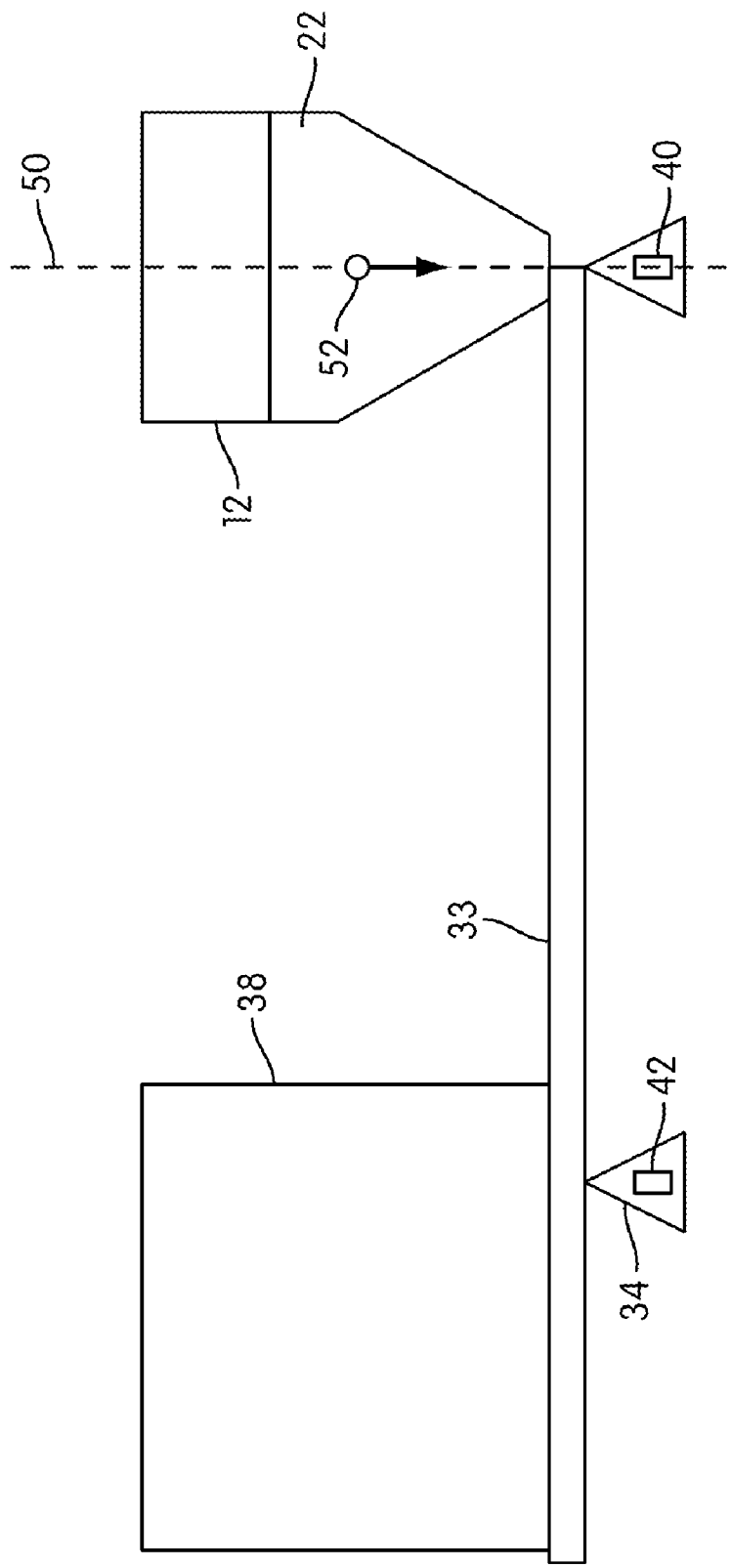
FIG. 3 is a schematic diagram of the system of FIG. 2 with material evenly distributed in the hopper.
Figure 4:
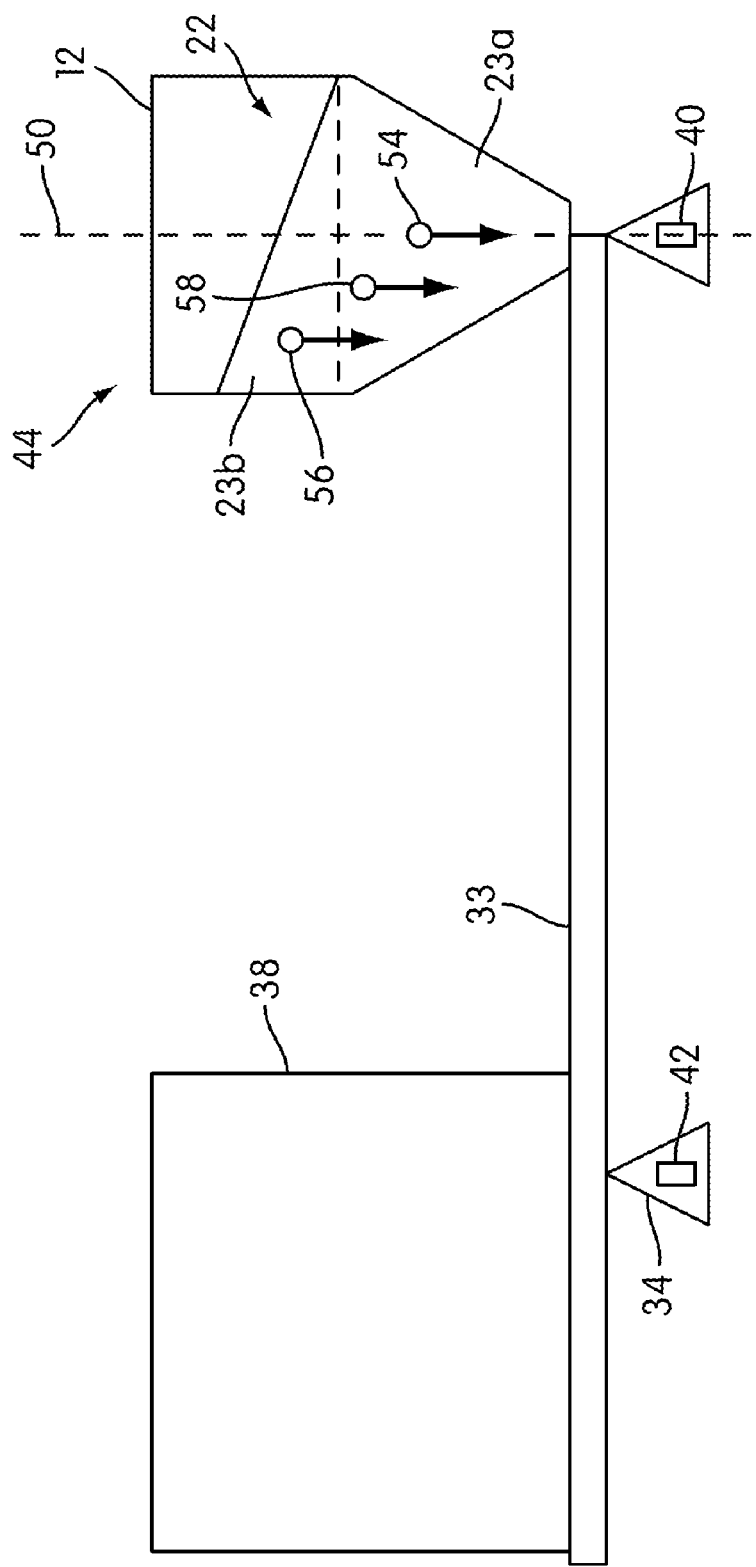
FIG. 4 is a schematic diagram of the system of FIG. 2 with material unevenly distributed in the hopper.

According to a preferred embodiment, weight sensing system 20 is configured to measure or detect the weight of material 22 being dispensed by feeder 14. Weight sensing system 20 comprises a first sensor (shown as a hopper load cell 40), and a second sensor (shown as a pivot load cell 42). FIGS. 2-4 schematically illustrate the scale 16 and weight sensor system 20 for use with a dispensing system. Alternatively, such a scale and weight sensor system may be used in other applications. For example, such a scale or weight sensor system (e.g., multiple load cell) may be used in other applications, including other dispensing systems as well as other dynamic operations such as loading or unloading trucks, trailers, railcars, or anywhere there is a large dead load weight relative to a live load weight.

According to an exemplary embodiment, the load cells comprise a weight-to-electrical transducer having a linear conversion characteristic. According to alternative embodiments, the load cells may be any of a variety of sensors or other device that converts force into a measurable mechanical or electrical output, such transducers, strain gauge, or the like.

The weight of hopper 12 without material 22, e.g., the weight on scale 16 at the point prior to when the hopper is filled or refilled, is referred to as the "tare" weight of hopper 12. Scale 16 is counterbalanced by a counterbalance force, preferably applied to frame 33. According to a preferred embodiment, the counterbalance force is provided mechanically by a "dead" weight load 38. Dead weight load 38 is configured to counterbalance or offset the weight of hopper 12 so that hopper load cell 40 output signal is representative of the weight of material 22 in hopper 12. As such, output of hopper load cell 40 is thus zeroed to the tare weight of hopper 12. Further, the weight of components acting on pivot 34, including scale 16, hopper 12, dead weight load 38, feeder 14, or the like, is referred to as the scale "tare" weight and pivot load cell 42 is zeroed to the scale tare weight. As such, output of pivot load cell 42 is thus zeroed to the tare weight acting on pivot 34. Control is effected in accordance with differences in the weight, than absolute weight, and non-zero signals indicative of the tare weights may thus be accommodated.

Mechanically counterbalancing scale 16 to minimize the tare weight signals is particularly advantageous, as compared to employing computational accommodations. Mechanically counterbalancing to tare the load cells permits operation over the complete operational range of at least hopper load cell 40, thus providing improved or enhanced resolution. According to alternative embodiments, the dead weight load may be employed to offset other weights associated with the system, such as the weight of the hopper as described above, as well as the weight of material within the hopper at the beginning of a dispensing cycle, the weight of other equipment or components associate with the dispenser such as the feeder, or the like. Dead weight 38 may be provided by any of a variety of weighted structures, such as functional devices and non-functional "dead" weight, that offsets or balances the weight of the material in hopper 12. According to an exemplary embodiment, dead load 38 is in the form of counterweights disposed on frame 33 to lift or pivot hopper 12 about pivot 34 with respect to a load cell flexure point. Dead load 38 may be adjustable, configurable, or reconfigurable for different hoppers, set-ups, or the like. Alternatively, the counterbalance force is provided by any of a variety of devices, including pneumatic, hydraulic, electric, electronic, electro-mechanical, or the like.

Hopper load cell 40 is located so that the center of gravity of material 22 in hopper 12 is placed directly over hopper load cell 40 when material is in an evenly distributed position or condition, e.g., level height, consistent density, etc. Because dead load 38 offsets the weight of material 22 in hopper 12, hopper load cell 40 is configured to sense or measure the live load of material 22 when the center of gravity of material 22 in hopper 12 is directly over hopper load cell 40.

Pivot load cell 42 is intended to compensate for a shifting of the center of gravity of the material in the hopper 12. For example, material characteristics (e.g., angle of repose, etc.) causes small amounts (or more) of material weight to at least slightly shift the center of gravity to create an "offset" or "shifted" load 44. The load is offset or shifted in that the center of gravity is no longer directly over hopper load cell 40. A shifted load 44 is not fully detected by hopper load cell 40 (i.e., hopper load cell 40 no longer detects or senses the entire weight of material 22 in hopper 12). Pivot load cell 42 is configured to measure or detect the weight of material that has shifted within hopper 12. The total weight of the material in the hopper when there is a shifted load is the sum of hopper load cell 40 and pivot load cell 42. Generally, the majority of the weight from the offset load material 22 will be detected by hopper load cell 40.

Summing the weight detected by pivot load cell 42 and hopper load cell 40 is intended to measure the entire changing "live" load of material 22 within hopper 12 with higher resolution, accuracy, and response time, while allowing application of larger (heavier) dead loads like motors, controls and containers. Data from hopper load cell 40, pivot load cell 42, feeder 14, and the like is collected, stored, and preferably used to make adjustments to the output of material 22 (e.g., the speed of metering screw 24). According to a preferred embodiment, such collection, storing, and adjustment is done by controller 18 or other peripheral devices.

The force diagram and equations below show the application of forces on the load cells from the weight of the hopper, and material within the hopper, and counterweights.

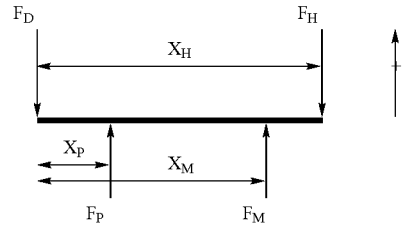

$F_D$=Force due to drive equipment
$X_D$=Location of force due to drive equipment
$F_H$=Force due to feed hopper
$X_H$=Location of force due to feed hopper
$F_P$=Force on the pivot load cell
$X_P$=Location of the pivot load cell
$F_M$=Force on the measuring load cell
$X_M$=Location of measuring load cell $$F_P+F_M+F_D+F_H=0 \quad \text{(Forces in equilibrium)}$$

$$F_P X_P+F_M X_M+F_D X_D+F_H X_H=0 \quad \text{(Moments in equilibrium)}$$

Solve for $F_M$ and $F_P$:

$$F_M=-F_D-F_H-F_P$$

$$F_P X_P=-F_H X_H-F_D(0)-F_M X_M$$

$$F_P X_P=-F_H X_H-(-F_D-F_H-F_P)X_M$$

$$F_P X_P=-F_H X_H+F_D X_M+F_H X_M+F_P X_M$$

$$F_P(X_P-X_M)=-F_H X_H+F_D X_M+F_H X_M$$

$$F_P=(-F_H X_H+F_D X_M+F_H X_M)/(X_P-X_M)$$

FIG. 1 shows a schematic illustration of system 10, including hopper 12 (without any material), scale 16, pivot 34, dead weight load 38, hopper load cell 40, and pivot load cell 42. The weight of dead weight load 38 and empty hopper 12 is applied to pivot 34. The center of gravity 48 of empty hopper 12 is preferably directly over hopper load cell 40 as illustrated by line 50.

FIG. 3 shows a schematic illustration of system 10 with material 22 in hopper 12 in the evenly distributed condition. The center of gravity 52 of material 22 is aligned with line 50 and is directly over hopper load cell 40. As such, the total weight of material 22 in hopper 12 is detected by hopper load cell 40. The weight of material 22, if any, in this condition detected by pivot load cell 42 is negligible, e.g., zero or approximately zero.

FIG. 4 shows a schematic illustration of system 10 with material 22 in an unevenly distributed condition. The center of gravity 54 of even portion 23a of material 22 is aligned with line 50 and directly over hopper load cell 40. The center of gravity 56 of uneven portion 23b of material 22 is offset or spaced apart from line 50 and not directly over hopper load cell 40. The weight of material that comprises uneven portion 23b will be detected by fulcrum load cell and hopper load cell 40 depending on the nature of the uneven distribution of the material, e.g., 10% by pivot load cell 42 and 90% by hopper load cell 40 or other proportions depending on the nature of the shifted load. Thus, the total weight of material 22 in hopper 12 has a center of gravity 58 and is measured or calculated by summing the weight detected by hopper load cell 40 and the weight detected by pivot load cell 42.

According to an exemplary embodiment, hopper load cell 40 comprises a load cell with a larger capacity than pivot load cell 42. According to a preferred embodiment, hopper load cell 40 comprises a load cell with a capacity of approximately ten times (10×) the capacity of pivot load cell 42. According to a particularly preferred embodiment, hopper load cell 40 comprises a 10 kilogram load cell and the pivot load cell 42 comprises a 200 gram load cell. According to alternative embodiments, any of a variety of load cell sizes may be used.

The relative weight capacities of the load cells provide that the lower capacity hopper load cell 40 has a higher resolution and faster response rate relative to the higher capacity pivot load cell 42, which has a lower resolution and a slower response rate.

The signal from the pivot load cell 42 is filtered by a filter with a time constant $\tau_P$ and the signal from the hopper load cell to is filtered by a filter 82 with a time constant $\tau_H$. The time constant $\tau_P$ for the higher capacity pivot load cell 42 and the time constant $\tau_H$ for lower capacity hopper load cell 40 are configured or selected to provide the pivot load cell 42 with approximately the same resolution as hopper load cell 40. According to an exemplary embodiment, the time constant $\tau_P$ of filter 80 is greater (e.g., longer) than the time constant $\tau_H$ of filter 82. The longer time constant $\tau_P$ for filter 80 is intended to provide greater resolution to the higher weigh capacity pivot load cell 42 and to allow controller 18 to collect more data (and provide an average) to provide a higher resolution (e.g., to 0.001 grams for a typical 200 g load cell). Because the center of gravity of the material 22 in hopper 12 is changing relatively slowly (i.e., relative to the response rate of the load cells and the feed rate generally), the data from filter 42 with the shorter time constant $\tau_H$ for hopper load cell 40 keeps up with the longer time constant $\tau_P$ for pivot load cell 42. Filter 80 for pivot load cell 42 is intended to improve the resolution that compliments or corresponds to the fast response and high resolution of the hopper load cell 40. Over an extended period of time, the center of gravity will typically return to be directly over the hopper load cell 40 such that substantially the entire weight of the material will be detected by hopper load cell 40.

According to a preferred embodiment, the time constants of the filters for the load cells are proportional to the load cell weight capacities. For example, if hopper load cell 40 has a weight capacity of 200 grams and the pivot load cell 42 has a weight capacity of 10 kilograms (kg), the statistical resolution may be the same (1:50), which provides that $\tau_H$=30 seconds and $\tau_P$=150 seconds. According to alternative embodiments the ratio is 3:10; 3:30; or the like. For an exemplary typical dry material dispending applications, filter 80 with a time constant of 30 seconds ($\tau_P$=30 seconds) and filter 82 with a time constant of $\tau_H$=3 seconds would preferably be used. Alternatively, filters with any of a variety of time constants that increases the resolution of the pivot load cell may be used.

Figure 5:
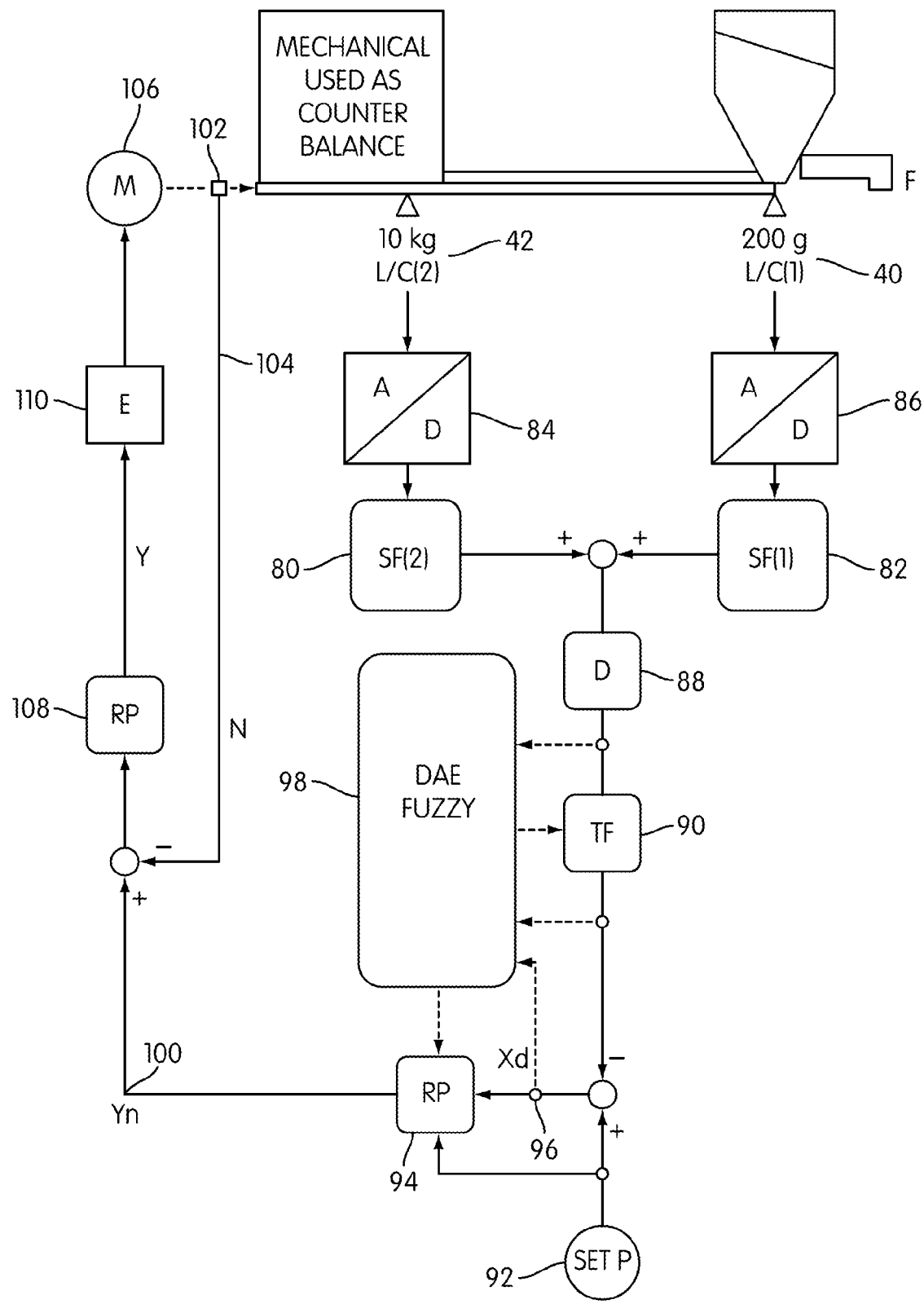
FIG. 5 is a schematic diagram of a control system for a dispensing system.

FIG. 5 illustrates a schematic diagram of an exemplary control circuit for system 10. The signal(s) from pivot load cell 42 are received by and converted from analog to digital signals by analog/digital converter 84 and then filtered by filter 80. The signal(s) from hopper load cell 40 are received by and converted from analog to digital signals by analog/digital converter 86 and then filtered by filter 82. According to an exemplary embodiment, filter 82 is a fast response and selected to resolve small weights, and filter 80 is selected for a slow response to increase resolution (e.g., equal to pivot load cell 42 divided by hopper load cell 40 and multiplied by the time constant for filter 82). The signals from filters 80, 82 are received by a differentiator 88, which sums the signals to calculate the feed rate from these weight signals. A signal representative of the feed rate is provided to a low pass filter (preferably a high order, adaptive low-pass filter) that filters the signal for the purpose of adapting the control to a variety of noise environments. The set point feed rate 92 is compared to the actual feed rate by set point/actual difference, and routed to a set point controller 94 to calculate a deviation 96. Controller 94 is preferably equipped with additional pre-control, which enables set point variations to be acquired faster. The set point controller 94 receives a signal representative of the set point feed rate (SET P) 92 and a signal representative of a deviation 96 calculated by dividing the value of the set point feed rate 92 subtracted from the actual feed rate by the nominal value (i.e., (set point feed rate—actual feed rate)/nominal value*100%). A disturbance auto eliminator (DAE) 98 with fuzzy logic is in communication with the signals between differentiator 88 and set point controller 94 to monitor and record abnormal disturbances using a control algorithm. The set point controller 94 produces a signal representative of the set speed control magnitude 100. A feedback tachometer 102 produces a signal 104 representative of the speed of a motor 106 that is compared to the set speed control magnitude 100. A speed controller 108 may be used with an external limit stage 110 to serve as a feed unit output controller in exemplary embodiments. The speed of motor 106 is thus modified based on detected measurements of the loss in material weight of material in hopper 12.

Figure 6:
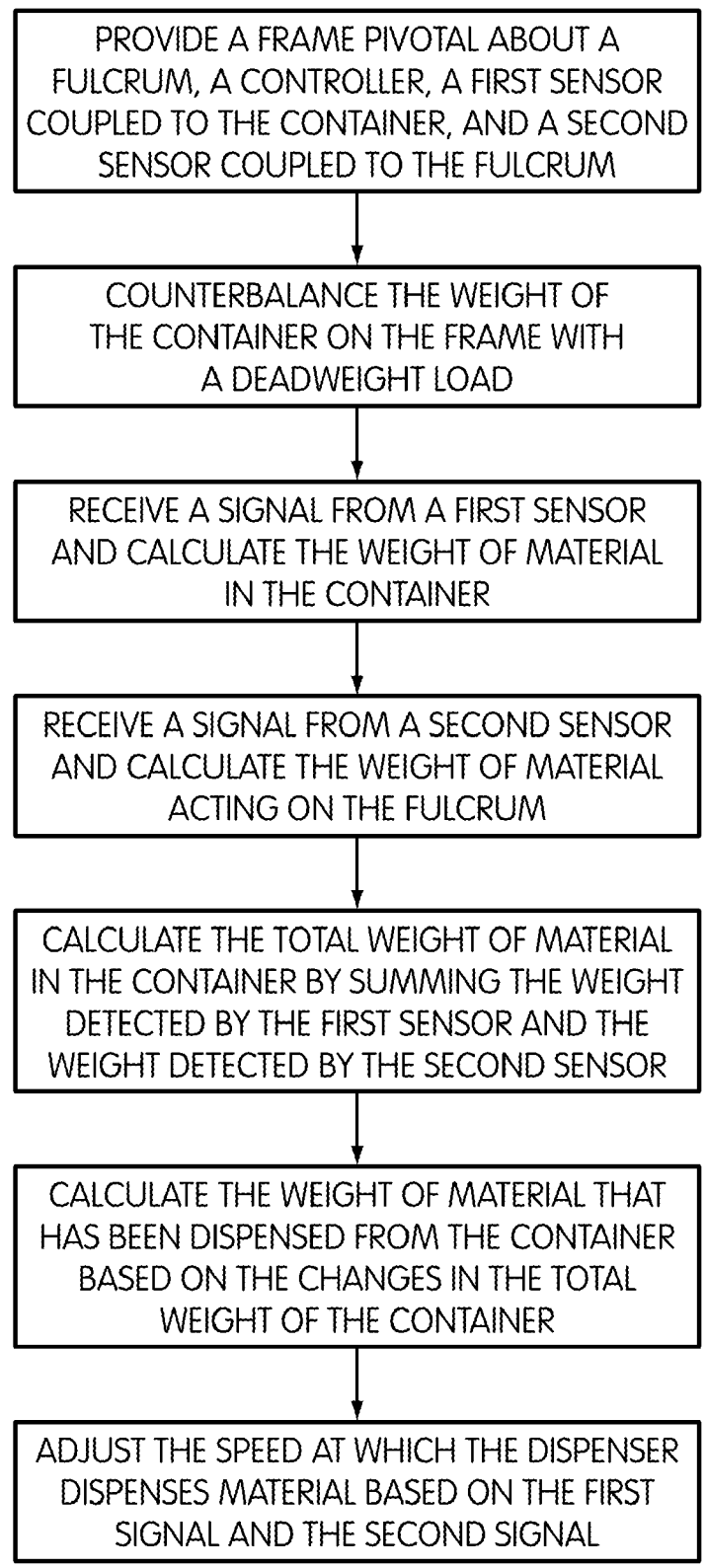
FIG. 6 is a block flow diagram of a process of dispensing material according to an exemplary embodiment.

According to an exemplary embodiment shown in FIG. 6, a method 60 for calculating the total weight of material within hopper 12 in a dispensing system 10 comprises providing a frame pivotal about a fulcrum, a first sensor coupled to the container, and a second sensor coupled to the fulcrum (step 62). At least the weight of hopper 12 is counterbalanced, for example by dead load 38 (step 64). At least the weight of material in hopper 12 is detected or measured, based on a signal received from the first sensor (step 66). Weight of material that is acting on pivot 34, such as the weight of material that is offset from the first sensor, is detected based on a signal received from the second sensor (step 68). The total weight of material in hopper 12 is calculated by summing the weight detected by the first sensor and the weight detected by the second sensor (step 70). The method may also comprise providing a controller that receives the first signal and the second signal (step 72), calculating the weight of material that has been dispensed from hopper 12 based on the changes in the total weight of the container (step 74), and adjusting the speed at with the dispenser dispenses material based on the first signal and the second signal (step 76).

While the components of the disclosed embodiments will be illustrated as a loss-in-weight dispensing system, the features of the disclosed embodiments have a much wider applicability. For example, the multiple load cell design is adaptable for other dispensing systems, including other dispensing systems as well as other dynamic operations such as loading or unloading trucks, trailers, railcars, or anywhere there is a large dead load weight relative to a live load weight. Further, the size and scale of the various components and the size of the containers can be widely varied.

Also, the particular materials or products that may be dispensed are also illustrative. For example, the dispensing system may be used for any of a variety of dispensed products, including liquid, fine powder, or larger bulk solid.

Further, it is important to note that the term "hopper," "scale," "feeder," and "load cell" are intended to be broad terms and not terms of limitation. These components may be used with any of a variety of products or arrangements and are not intended to be limited to use with loss-in-weight dispensing applications.

It is also important to note that the construction and arrangement of the elements of the counterbalanced dispensing system with multiple load cells as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the sensor used to measure weight may be any of a variety of sensors besides the load cells schematically illustrated in the drawings. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A system for dispensing material comprising:
   a hopper configured to contain the material;
   a dispenser configured to receive material from the hopper and to dispense material;
   a frame pivotal about a pivot and configured to support at least the hopper;
   a first sensor configured to provide a first signal representative of the weight of at least a first portion of the material in the hopper;
   a second sensor coupled to the pivot and configured to provide a second signal representative of the weight being applied to the pivot, wherein the first sensor has a higher resolution and a faster response rate relative to the second sensor;
   a first filter to filter the first signal and to provide a first filtered signal, the first filter having a first time constant;
   a second filter to filter the second signal and to provide a second filtered signal, the second filter having a second time constant that is greater than the first time constant;
   a device configured to use the first filtered signal and the second filtered signal to determine the weight of the material in the hopper.

2. The system of claim 1 wherein the second time constant is greater than the first time constant by an amount configured to result in the first filtered signal and the second filtered signal providing approximately the same resolution.

3. The system of claim 1, wherein the first portion of the material has a center of gravity that is directly over the first sensor, and wherein the second portion of the material has a center of gravity that is not directly over the first sensor.

4. The system of claim 1 wherein the weight of material detected by the second sensor is not acting on the first sensor.

5. The system of claim 4 wherein the weight of material detected by the second sensor is representative of material that has shifted in the hopper.

6. The system of claim 1 wherein material has a first condition wherein the center of gravity of the material is directly over the first sensor.

7. The system of claim 6 wherein material has a second condition wherein the center of gravity of the material is offset from the first sensor.

8. The system of claim 1 wherein the weight of the hopper is offset by a counterbalance force which is approximately the weight of at least the hopper.

9. The system of claim 8 wherein the material that is offset is material that has shifted within the hopper during dispensing of material.

10. The system of claim 8 wherein the counterbalance force is applied to the frame.

11. The system of claim 10 wherein the counterbalance force comprises a counterweight coupled to the frame.

12. The system of claim 1 wherein the weight detected by the second sensor is representative of the weight of a second portion of the material in the hopper.

13. The system of claim 1 wherein the second sensor is configured to sense the hopper, material within the hopper, the frame, and the counterweight.

14. The system of claim 1 further comprising a controller configured to calculate weight of material that has been dispensed from the hopper based on the changes in the total weight of the hopper, and to adjust the speed at with the dispenser dispenses material based on the first signal and the second signal.

15. The system of claim 1 wherein the system comprises a loss-in-weight dispenser system.

16. The system of claim 1 wherein total weight of material in the hopper is the sum of the weight detected by the first sensor and the weight detected by the second sensor.

17. The system of claim 1 wherein the load capacity of the second sensor is greater than the load capacity of the first sensor.

18. The system of claim 1 wherein the load capacity of the second sensor is substantially greater than the load capacity of the first sensor.

19. The system of claim 1 wherein the load capacity of the second sensor is at least ten times greater than the load capacity of the first sensor.

20. The system of claim 1 wherein the first sensor comprises a load cell and the second sensor comprises a load cell.

21. A weight measurement system for detecting a total weight of material in a container that is counterbalanced about a pivot, the weight measurement system comprising:
   a first sensor configured to provide a signal representative of at least a portion of the weight of material in the container;
   a second sensor coupled to the pivot and configured to provide a signal representative of the weight of material that is not detected by the first sensor;

a device in communication with the first sensor and the second sensor and configured to sum the weight detected by the first sensor and the weight detected by the second sensor;

a first filter with a first time constant configured to receive the signal from the first sensor, and a second filter with a second time constant configured to receive the signal from the second sensor, wherein the ratio of the first time constant to the second time constant is proportional to the ratio of a characteristic of the first sensor to a characteristic of the second sensor.

22. The system of claim 21 wherein material within the container has a first condition wherein the center of gravity of a first portion of the material is directly over the first sensor, and a second condition wherein the center of gravity of a second portion of the material off-center relative to the first sensor.

23. The system of claim 21 wherein the center of gravity of the weight of material in the container in the first condition is directly over the first sensor.

24. The system of claim 23 wherein the weight of material that is off-center relative to the first sensor is representative of material that has shifted in the container.

25. The system of claim 21 further comprising a controller configured to calculate weight of material that has been dispensed from the container based on the changes in the total weight of the container, and to adjust the speed at with the dispenser dispenses material based on the first signal and the second signal.

26. The system of claim 21 wherein the characteristic of the first sensor is the weight capacity of the first sensor and the characteristic of the second sensor is the weight characteristic of the second sensor.

27. The system of claim 21 wherein the proportion is less than 1:50.

28. A method for calculating the total weight of material within a hopper in a dispensing system, the method comprising:

providing a frame pivotable about a pivot, a first sensor, and a second sensor;

counterbalancing at least the weight of the hopper;

detecting at least a portion of the weight of the material in the hopper based on a first signal from the first sensor;

detecting the weight being applied to the pivot based on a second signal received from the second sensor, wherein the first sensor has a higher resolution and a faster response rate relative to the second sensor;

filtering the first signal from the first sensor using a first filter having a first time constant;

filtering the second signal from the second sensor using a second filter having a second time constant to provide data at a second time constant that is greater than the first time constant; and adding the weight detected by the first sensor and the weight detected by the second sensor.

29. The method of claim 28 wherein the step of counterbalancing at least the weight of the hopper comprises applying a counterbalance force to the frame.

30. The method of claim 28 farther comprising the steps of:

providing a controller that receives the first signal and the second signal calculating the weight of material that has been dispensed from the hopper based on the changes in the total weight of the hopper, and adjusting the speed at with the dispenser dispenses material based on the first signal and the second signal.

31. An apparatus for detecting weight of material in a container comprising:

a frame counterbalanced on a pivot by a counterbalance force and configured to support the container;

a first sensor configured to provide a first signal representative of at least a portion of the weight of material in the container;

a second sensor coupled to the pivot and configured to provide a second signal representative of the weight supported by the frame; and a device in communication with the first sensor and the second sensor and configured to sum the weight detected by the first sensor and the weight detected by the second sensor;

wherein the first sensor has a higher resolution and a faster response rate relative to the second sensor, the apparatus further comprising a first filter to filter the first signal and a second filter to filter the second signal, the second filter having a time constant that is greater than the time constant of the first filter.

32. The apparatus of claim 31 wherein material within the container has a first condition wherein the center of gravity of the material is directly over the first sensor, and a second condition wherein the center of gravity of at least a portion of the material off-center relative to the first sensor.

33. The apparatus of claim 31 wherein the center of gravity of the weight in the container in the first condition is directly over the first sensor, and wherein the weight of material that is off-center relative to the first sensor is representative of material that has shifted in the container.

34. The system of claim 31 wherein the load capacity of the second sensor is greater than the load capacity of the first sensor.

35. The system of claim 31 wherein the load capacity of the second sensor is at least ten greater than the load capacity of the first sensor.

* * * * *

UNITED STATES PATENT AND TRADEMARK OFFICE
CERTIFICATE OF CORRECTION

PATENT NO.        : 7,534,970 B2                                       Page 1 of 1
APPLICATION NO.   : 11/453401
DATED             : May 19, 2009
INVENTOR(S)       : Ronald S. Tump It is certified that error appears in the above-identified patent and that said Letters Patent is hereby corrected as shown below:

Claim 1, column 9, line 48; Replace "pivotal" with --pivotable--

Claim 30, column 12, line 6; Replace "farther" with --further--

Claim 35, column 12, line 50; insert "times" after --ten--

Signed and Sealed this

Thirtieth Day of June, 2009

JOHN DOLL
*Acting Director of the United States Patent and Trademark Office*